(12) United States Patent
Yin et al.

(10) Patent No.: US 11,703,161 B2
(45) Date of Patent: Jul. 18, 2023

(54) INTERNAL SPIRAL CONDUIT BEARING CAPACITY REINFORCING DEVICE AND METHOD FOR USING THE SAME

(71) Applicant: China University of Petroleum-Beijing, Beijing (CN)

(72) Inventors: Qishuai Yin, Beijing (CN); Jin Yang, Beijing (CN); Shanshan Shi, Beijing (CN); Yang Long, Beijing (CN); Qianling Xue, Beijing (CN); Li Li, Beijing (CN)

(73) Assignee: China University of Petroleum-Beijing, Beijing (CN)

( * ) Notice: Subject to any disclaimer, the term of this patent is extended or adjusted under 35 U.S.C. 154(b) by 820 days.

(21) Appl. No.: 16/514,970

(22) Filed: Jul. 17, 2019

(65) Prior Publication Data
US 2020/0166160 A1 May 28, 2020

(30) Foreign Application Priority Data

Nov. 26, 2018 (CN) .......................... 201811414858.7

(51) Int. Cl.
*F16L 11/12* (2006.01)
*E21B 17/22* (2006.01)
(52) U.S. Cl.
CPC ............ *F16L 11/121* (2013.01); *E21B 17/22* (2013.01)
(58) Field of Classification Search
CPC .......... E21B 17/02; E21B 17/22; E21B 17/10; E21B 17/1078; E21B 7/128; E02D 5/72;
(Continued)

(56) References Cited

U.S. PATENT DOCUMENTS 1,743,101 A * 1/1930 Blackburn .............. E02D 5/803
52/159
3,129,774 A * 4/1964 Armstrong .............. E21B 7/128
175/7
(Continued)

FOREIGN PATENT DOCUMENTS

CN 2654687 A 11/2004
CN 101684646 A 3/2010
(Continued)

OTHER PUBLICATIONS

Merriam Webster Buckle https://www.merriam-webster.com/dictionary/buckle (Year: 2022).*
(Continued)

*Primary Examiner* — David Carroll
(74) *Attorney, Agent, or Firm* — Loza & Loza, LLP; Michael Fedrick

(57) ABSTRACT

A bearing capacity reinforcing device. The bearing capacity reinforcing device comprises: a reinforcing mechanism having a reinforcing body and a reinforcing disc connected to a lower portion of the reinforcing body, a plurality of reinforcing rib plates being spaced apart in a circumferential direction of the reinforcing body and connected to the reinforcing disc; wherein the reinforcing disc is provided with a plurality of accommodating spaces which are spaced apart in a circumferential direction thereof and provided therein with a movable sector plate, respectively, and the reinforcing disc at each of the accommodating spaces is provided with a perforated portion which can be blocked by the sector plate; and a connecting portion having a male buckle end connected to a lower end of the reinforcing body, and a female buckle end connected to an upper end of the reinforcing body. The present disclosure can increase the area of action between the riser or the surface conduit and the seabed soil, thereby increasing the bearing capacity of (Continued)

the conduit to ensure the safety and high efficiency of on-site exploration and development operations.

9 Claims, 5 Drawing Sheets

(58) Field of Classification Search
CPC .. E02D 5/803; E02D 5/76; E02D 5/80; E02D 5/805
See application file for complete search history.

(56) References Cited

U.S. PATENT DOCUMENTS

| | | | | |
|---|---|---|---|---|
| 3,137,348 | A * | 6/1964 | Ahlstone | E21B 33/043 166/368 |
| 3,252,528 | A * | 5/1966 | Nicolson | E21B 29/12 175/7 |
| 3,380,519 | A * | 4/1968 | Fowler | E21B 33/043 175/7 |
| 3,398,790 | A * | 8/1968 | Wakefield, Jr. | E21B 33/035 166/367 |
| 3,435,906 | A * | 4/1969 | Nicolson | E21B 33/035 175/103 |
| 3,504,740 | A * | 4/1970 | Manning | E21B 7/12 166/366 |
| 3,672,447 | A * | 6/1972 | Kofahl | E21B 7/20 175/7 |
| 3,885,623 | A * | 5/1975 | Watkins | E21B 33/035 166/368 |
| 3,999,617 | A * | 12/1976 | Ilfrey | E21B 7/128 175/7 |
| 4,097,069 | A * | 6/1978 | Morrill | E21B 33/038 166/344 |
| 4,662,785 | A * | 5/1987 | Gibb | F16L 1/26 166/359 |
| 2006/0196658 | A1 * | 9/2006 | Belcher | E21B 17/22 166/244.1 |
| 2013/0092386 | A1 * | 4/2013 | Gilmore | E21B 19/004 166/348 |
| 2014/0262260 | A1 * | 9/2014 | Mayer | E21B 43/088 166/278 |
| 2015/0144324 | A1 * | 5/2015 | Mueller | E21B 17/003 166/65.1 |
| 2019/0360281 | A1 * | 11/2019 | Golovinskij | E21B 17/01 |

FOREIGN PATENT DOCUMENTS

| | | |
|---|---|---|
| CN | 102416933 A | 4/2012 |
| CN | 105953648 A | 9/2016 |
| GB | 2267525 A | 12/1993 |

OTHER PUBLICATIONS https://www.merriam-webster.com/dictionary/buckling Accessed 2022 (Year: 2022).*

"Use spiral welded pipe to improve the steel plate warehouse support force", Cement Guide for New Epoch, No. 3, 2013, 3 pages.
The Test Study on the Loading Transfer Mechanism of Model Piles With Branches and Plates, Master's thesis of Zhejiang University of Technology, Apr. 2019, 46 pages.
PCT Specialized Search Report prepared by the China Patent Information Center dated Mar. 19, 2019, 10 pages.

* cited by examiner

INTERNAL SPIRAL CONDUIT BEARING CAPACITY REINFORCING DEVICE AND METHOD FOR USING THE SAME

TECHNICAL FIELD

The present disclosure relates to the technical field of offshore oil and gas drilling and completion, and in particular to a bearing capacity reinforcing device and a method for using the same.

BACKGROUND ART

As China increases the efforts in the oil and gas exploration and development, the oil and gas exploration regions gradually turn from the land to the offshore shallow and deep water regions, which are also the regional focuses for the future oil and gas development.

The drilling and completion, and production operations in the offshore shallow water region cannot be performed without a water separation and a support to the surface blowout preventer (BOP) or the Christmas tree by a riser; while the drilling and completion, and production operations in the offshore deep water region cannot be performed without a support to the subsea blowout preventer (BOP) or the Christmas tree by a surface conduit. The bearing capacity of the riser or the surface conduit for the upper blowout preventer (BOP) or the Christmas tree mainly comes from a resistance between a side face of an outer wall of the conduit and the seabed soil and a resistance between an end face of a bottom of the conduit and the seabed soil. The magnitude of the bearing capacity is related to an area of action between the conduit and the seabed soil, i.e., the bearing capacity increases as a driving depth, and/or a diameter and a wall thickness, of the conduit increase.

However, due to the technical and cost constraints, it is usually impossible to set the conduit too deep, which leads to a phenomenon that the conduit often sinks sharply due to insufficient bearing capacity during the subsequent operation. As a result, the drilling and completion, and production operations cannot be carried out normally, while causing a large amount of economic losses and even a marine ecological environment pollution.

Therefore, the bearing capacity of the riser or the surface conduit is the key in the drilling and completion, and production operations of the offshore oil and gas fields, and it influences the operation progress and success of a well.

SUMMARY OF THE DISCLOSURE

An objective of the present disclosure is to provide abearing capacity reinforcing device and a method for using the same, so as to increase an effective area of action between a riser or a surface conduit and the seabed soil, thereby increasing a bearing capacity of the conduit and ensuring the safety and high efficiency of on-site exploration and development operations.

The above objective of the present disclosure can be achieved by the following technical solutions:

The present disclosure provides a bearing capacity reinforcing device, comprising:

a reinforcing mechanism having a reinforcing body and a reinforcing disc connected to a lower portion of the reinforcing body, a plurality of reinforcing rib plates being spaced apart in a circumferential direction of the reinforcing body and connected to the reinforcing disc; wherein the reinforcing disc is provided with a plurality of accommodating spaces which are spaced apart in a circumferential direction thereof and provided therein with a movable sector plate, respectively, and the reinforcing disc at each of the accommodating spaces is provided with a perforated portion which can be blocked by the sector plate; and a connecting portion having a male buckle end connected to a lower end of the reinforcing body, and a female buckle end connected to an upper end of the reinforcing body.

The present disclosure further provides a method for using the bearing capacity reinforcing device aforementioned, comprising:

step S1: seating the bearing capacity reinforcing device on a female buckle of a conduit placed on a rotary table surface, and performing a buckling operation;

step S2: adjusting positions of a plurality of sector plates of the bearing capacity reinforcing device to ensure that each of the sector plates does not block a plurality of perforated portions on the reinforcing disc;

step S3: lifting up another conduit, seating a male buckle of the another conduit in a female buckle end of the bearing capacity reinforcing device, and performing a buckling operation;

step S4: setting a combined structure of the bearing capacity reinforcing device and a conduit string, until a driving depth of the conduit reaches a design depth; and step S5: setting an operating tool into the bearing capacity reinforcing device, and adjusting the positions of the plurality of sector plates so that the plurality of sector plates can block the plurality of perforated portions on the reinforcing disc.

The bearing capacity reinforcing device and the method for using the same in the present disclosure has the following characteristics and advantages:

1. The bearing capacity reinforcing device is located at a middle and/or a tail of a conduit, and may be plurally connected between the conduits at intervals at the same time, or may be singularly connected between the conduits, i.e., the bearing capacity reinforcing device may be used repeatedly for multiple times, or used singularly or plurally at the same time, so as to increase the bearing capacity of the conduit to the greatest extent, while the problem of difficulty in setting the device will not occur; during use, the present disclosure can reduce the driving depth of the conduit, and save the operation time and cost, thus achieving the advantages of a simple structure, a low cost, a convenient use, an easy operation and a high reliability.
2. The effective area of action between the string and the seabed soil is increased by using the bearing capacity reinforcing device, which can improve the bearing capacities of the riser in the offshore shallow water region and the surface conduit in the offshore deep water region, and prevent the riser or the surface conduit from sinking due to insufficient bearing capacity in the later operation process and resulting in the wellhead instability and abnormal drilling and completion operations.

DETAILED DESCRIPTION OF THE PREFERRED EMBODIMENTS

The technical solutions in the embodiments of the present disclosure will be clearly and completely described as follows with reference to the drawings in the embodiments of the present disclosure. Obviously, those described are merely parts, rather than all, of the embodiments of the present disclosure. Based on the embodiments of the present disclosure, any other embodiment obtained by a person skilled in the art without paying any creative labor should fall within the protection scope of the present disclosure.

Embodiment 1

Figure 1:
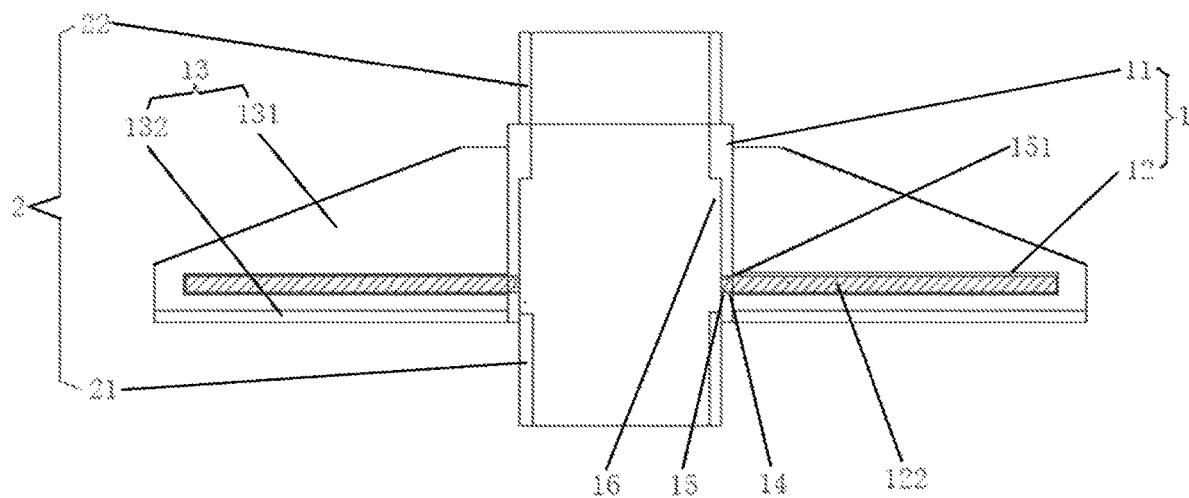
FIG. 1 is a front view of a bearing capacity reinforcing device of the present disclosure.
Figure 2:
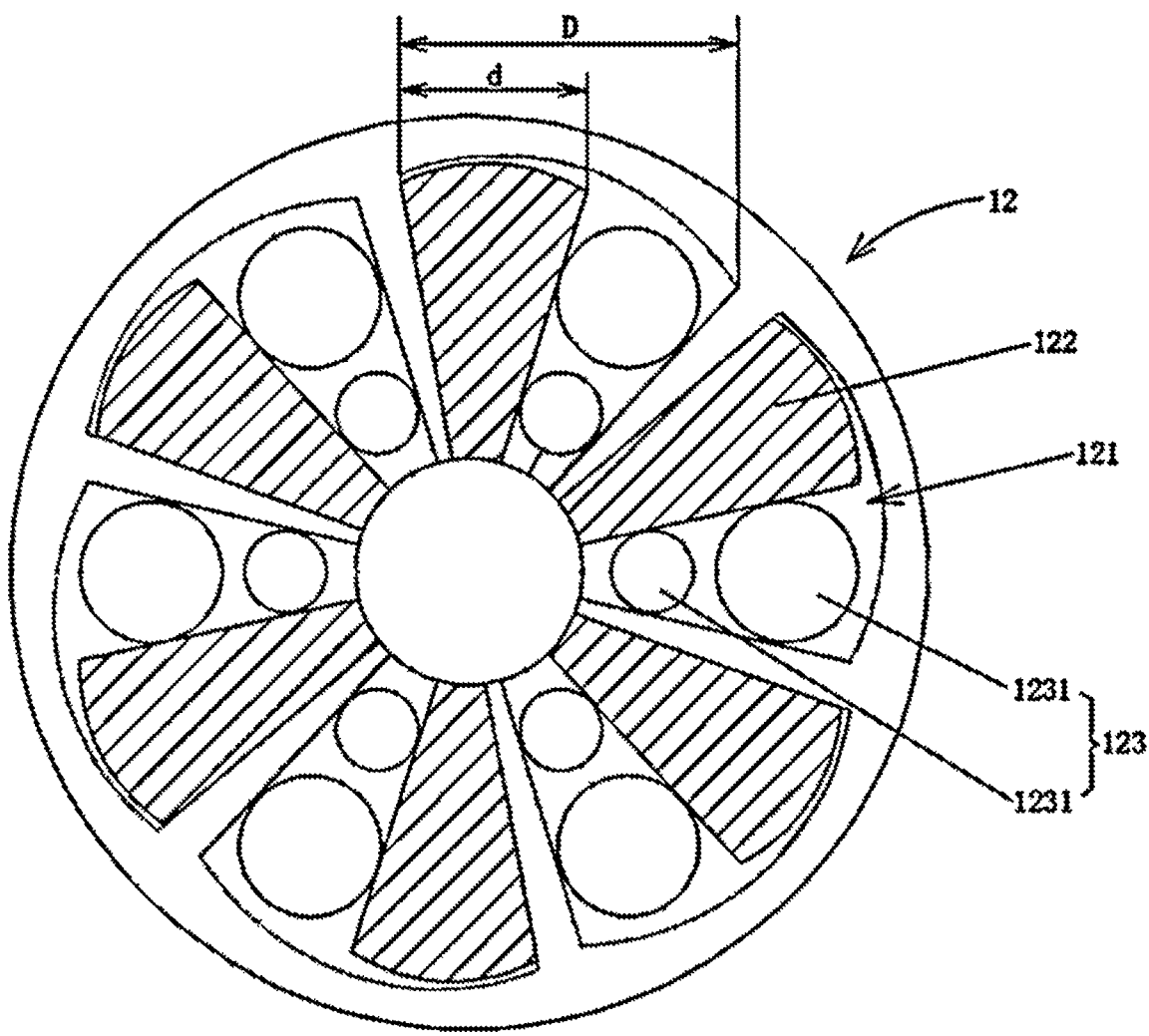
FIG. 2 is a top perspective view of a bearing capacity reinforcing device of the present disclosure.
Figure 3:
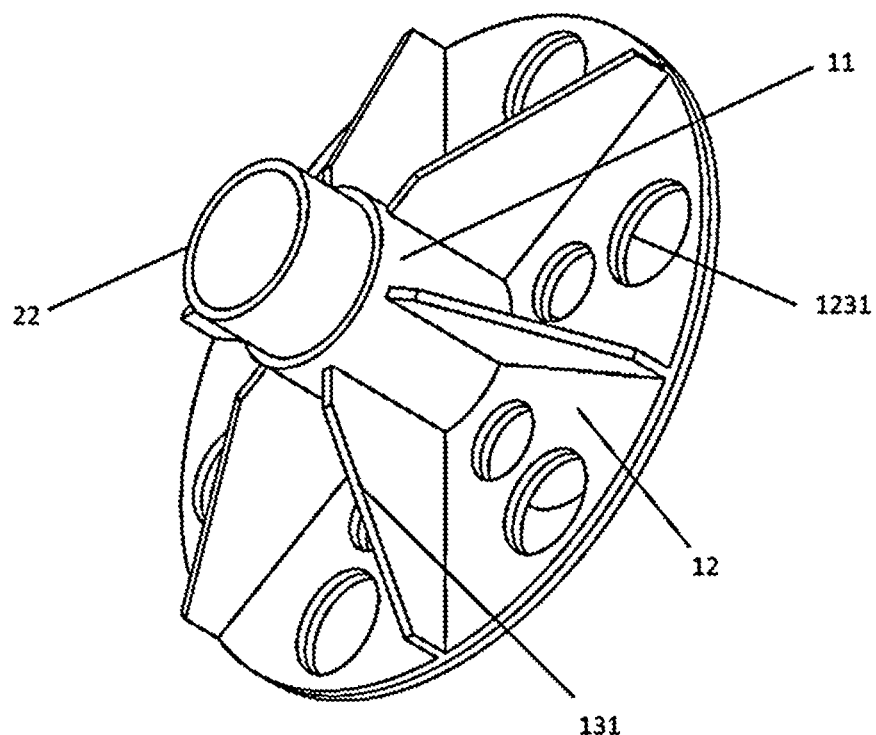
FIG. 3 is a stereo view of a bearing capacity reinforcing device of the present disclosure.

As illustrated in FIGS. 1 to 3, the present disclosure provides a bearing capacity reinforcing device, comprising a reinforcing mechanism 1 and a connecting portion 2, wherein the reinforcing mechanism 1 has a reinforcing body 11 and a reinforcing disc 12 connected to a lower portion of the reinforcing body 11, a plurality of reinforcing rib plates 13 being spaced apart in a circumferential direction of the reinforcing body 11 and connected to the reinforcing disc 12; wherein the reinforcing disc 12 is provided therein with a plurality of accommodating spaces 121 which are spaced apart in a circumferential direction thereof and provided therein with a movable sector plate 122, respectively, and the reinforcing disc 12 at each of the accommodating spaces 121 is provided with a perforated portion 123 which can be blocked by the sector plate 122; the connecting portion 2 has a male buckle end 21 connected to a lower end of the reinforcing body 11, and a female buckle end 22 connected to an upper end of the reinforcing body 11.

In order to solve the problem that the operation safety and efficiency are affected by the wellhead subsidence due to the insufficient bearing capacity of the riser or the surface conduit, the present disclosure designs a bearing capacity reinforcing device to increase the effective area of action between the riser or the surface conduit and the seabed soil, thereby increasing the bearing capacity of the conduit and ensuring the safety and high efficiency of on-site exploration and development operations.

Specifically, the connecting portion 2 has a male buckle end 21 and a female buckle end 22; the female buckle end 22 is in threaded connection with the upper end of the reinforcing body 11, located at a center of an upper end face of the reinforcing body 11, and may be connected to the male buckle end of the riser or the surface conduit in a threaded sealing manner; the male buckle end 21 is in threaded connection with a lower end of the reinforcing body 11, located at a center of a lower end face of the reinforcing body 11, and may be connected to the female buckle end of the riser or the surface conduit in a threaded sealing manner. The connecting portion 2 is mainly connected to the conduit (i.e., the riser or the surface conduit) by threads. In other embodiments of the present disclosure, the male buckle end 21 and the female buckle end 22 of the connecting portion 2 may also be connected to the reinforcing body 11 in any fixed sealing manner besides the welded connection, which is not limited herein.

The reinforcing mechanism 1 is a main body of the bearing capacity reinforcing device, having the reinforcing body 11 in a substantially cylindrical shape; the reinforcing disc 12 is connected to an outer wall of a lower portion of the reinforcing body 11, and substantially annular, with an outer diameter larger than that of the connecting portion 2, and an inner diameter consistent with that of the connecting portion 2. In the present disclosure, the reinforcing disc 12 is provided with a plurality of accommodating spaces 121 which are spaced apart in a circumferential direction thereof and substantially in a sector shape.

In the present disclosure, each of the accommodating spaces 121 of the reinforcing disc 12 is provided with a plurality of perforated portions 123 in a circumferential direction of the reinforcing disc 12; the perforated portions 123 are communicated with the accommodating space 121, run through upper and lower end faces of the reinforcing disc 12, and can effectively reduce the setting resistance to the bearing capacity reinforcing device of the present disclosure.

Specifically, the perforated portion 123 comprises a plurality of through-holes 1231 spaced apart in a radial direction of the reinforcing disc 12, with diameters thereof sequentially increased in a radial outward direction of the reinforcing disc 12 to ensure an overall strength of the reinforcing disc 12. In this embodiment, six perforated portions 123 are spaced apart in a circumferential direction of the reinforcing disc 12, each having two through-holes 1231 spaced apart in a radial direction of the reinforcing disc 12; of course, in other embodiments, four, eight or any other number of perforated portions 123 may be spaced apart in the circumferential direction of the reinforcing disc 12, each having one, three or more through-holes 1231 spaced apart in the radial direction of the reinforcing disc 12, which are not limited herein.

Further, each of the accommodating spaces 121 of the reinforcing disc 12 is provided with a sector plate 122 in the circumferential direction of the reinforcing disc 12; the sector plates 122 may be rotated at a certain angle in the accommodating space 121 under the action of an external force, so that the sector plates 122 can completely cover the plurality of perforated portions 123 on the reinforcing disc 12; the number of the sector plates 122 is consistent with the number of the perforated portions 123 arranged in the circumferential direction of the reinforcing disc 12; in a normal working state, the sector plate 122 is located in the accommodating space 121 of the reinforcing disc 12; a height of the accommodating space 121 is consistent with a thickness of the sector plate 122, so as to ensure that the sector plate 122 does not accidentally move in the accommodating space 121; a width D of the accommodating space 121 is larger than a width d of the sector plate 122; a shape of the accommodating space 121 is substantially consistent with a shape of the sector plate 122, so as to ensure that the sector plate 122 will not cover the plurality of through-holes 1231 on the perforated portion 123 under normal conditions, thereby ensuring that the effective area of action between the bearing capacity reinforcing device of the present disclosure and the soil is minimum, and reducing the setting resistance to the bearing capacity reinforcing device. In this embodiment, the width D of the accommodating space 121 is twice the width d of the sector plate 122, and the width d of the sector plate 122 is slightly larger than the diameter of each of the through-holes 1231 at the corresponding accommodating space 121.

In order to ensure that the reinforcing disc 12 has a certain shear strength, in the present disclosure, assuming that a shear strength of the reinforcing disc 12 is M, a diameter of the through-hole 1231 is d, a weight of the riser or the surface conduit on the bearing capacity reinforcing device is G, a weight capacity of the riser or the surface conduit is F, and a safety factor when the reinforcing disc 12 does not undergo a shear deformation is k, then a calculation formula of a thickness t of the reinforcing disc 12 is:

$$t = \frac{G+F}{k \cdot \pi \cdot d \cdot M}$$

In the embodiment of the present disclosure, an annular groove 14 is formed on an inner sidewall of the reinforcing body 11, an annular body 15 is rotatably provided in the annular groove 14, and inner ends of the plurality of sector plates 122 are connected to the annular body 15. The inner ends of the plurality of sector plates 122 are connected to an outer wall of the annular body 15 at an equal interval in a circumferential direction of the annular body 15, and drive the plurality of sector plates 122 to move synchronously when the annular body 15 rotates.

Figure 4:
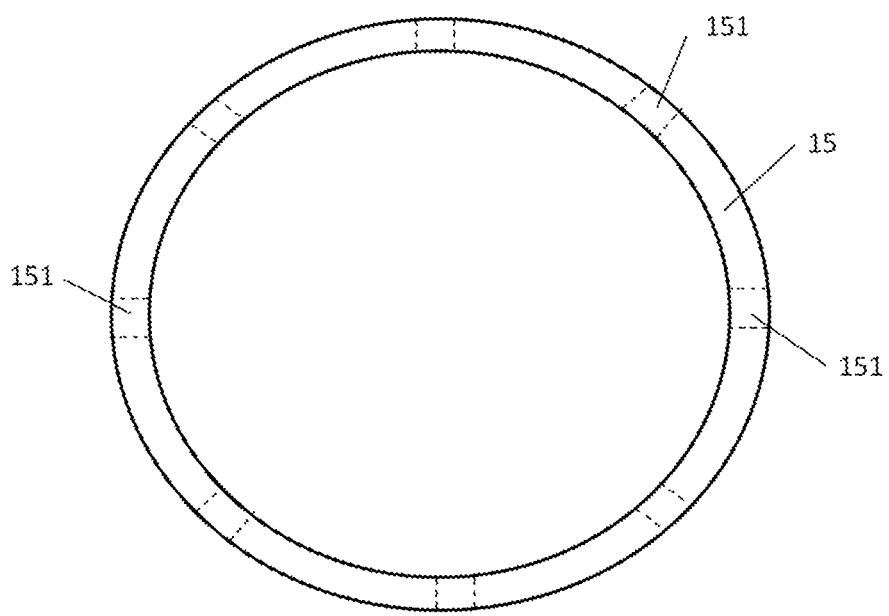
FIG. 4 is a top perspective view of an annular body of a bearing capacity reinforcing device of the present disclosure.

Further, as illustrated in FIG. 4, an inner annular wall of the annular body 15 is provided with a plurality of keyways 151 spaced apart in a circumferential direction thereof. By setting a specific downhole tool, the annular body 15 may be rotated by the keyways 151, thereby driving the plurality of sector plates 122 to rotate to completely cover the plurality of perforated portions 123 on the reinforcing disc 12. In this embodiment, a design rotation angle of the annular body 15 is about 30 degrees.

Since the interior of the reinforcing disc 12 is solid except the accommodating space 121 where the sector plate 122 is movable, on the one hand, the strength of the reinforcing disc 12 is ensured, and on the other hand, the movable range of the sector plate 122 is limited.

The plurality of reinforcing rib plates 13 are spaced apart in the circumferential direction of the reinforcing body 11. In the present disclosure, the reinforcing rib plate 13 comprises an upper rib plate 131 and a lower rib plate 132. In this embodiment, the upper rib plate 131 is a flat plate in a right-angled trapezoidal shape, which is in welded connection with the upper surface of the reinforcing disc 12 and the female buckle end 22, and an accommodating space 121 is provided between every adjacent two of the upper rib plates 131. The upper rib plates 131 mainly enhance the connection strength between the female buckle end 22 and the reinforcing body 11. The lower rib plate 132 is a rod in a rectangular shape or a flat plate in a right-angle trapezoidal shape, which is in welded connection with a lower surface of the reinforcing disc 12 and the male buckle end 21, and an accommodating space 121 is provided between every adjacent two of the lower rib plates 132. The lower rib plates 132 mainly enhance a shearing action of the reinforcing body 11 on the lower soil, so that the bearing capacity reinforcing device of the present disclosure can be more easily set after being combined with a conduit string, while the connection strength between the male buckle end 21 and the reinforcing body 11 is also enhanced. The plurality of upper rib plates 131 and the plurality of lower rib plates 132 of the reinforcing rib plates 13 are uniformly distributed at equal intervals on the upper and lower end faces of the reinforcing disc 12.

In the embodiment of the present disclosure, an inner wall of the reinforcing body 11 is provided with an annular accommodating groove 16 that is formed between the reinforcing body 11 and the male buckle end 21 of the connecting portion 2, wherein an axis of the annular accommodating groove 16 is provided coaxially with an axis of the reinforcing body 11, and the annular accommodating groove 16 provides a space for an operating tool set into the reinforcing mechanism 1.

Figure 5:
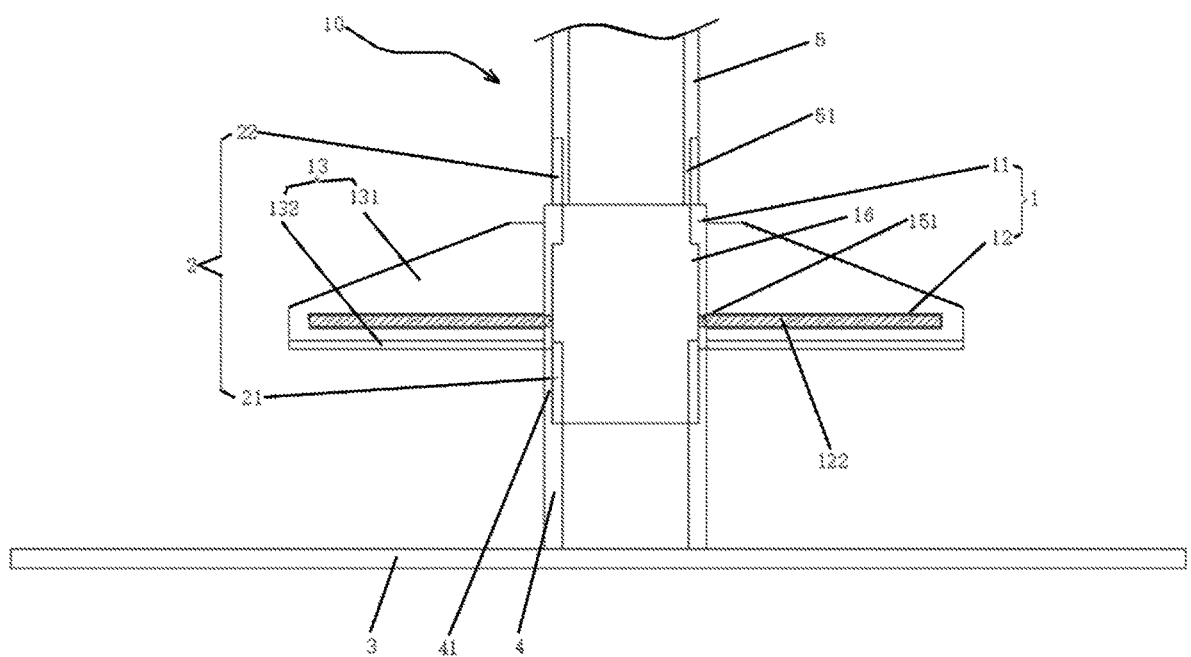
FIG. 5 is a schematic structural view of a bearing capacity reinforcing device for internal spiral conduits of the present disclosure in a working state 1.
Figure 6:
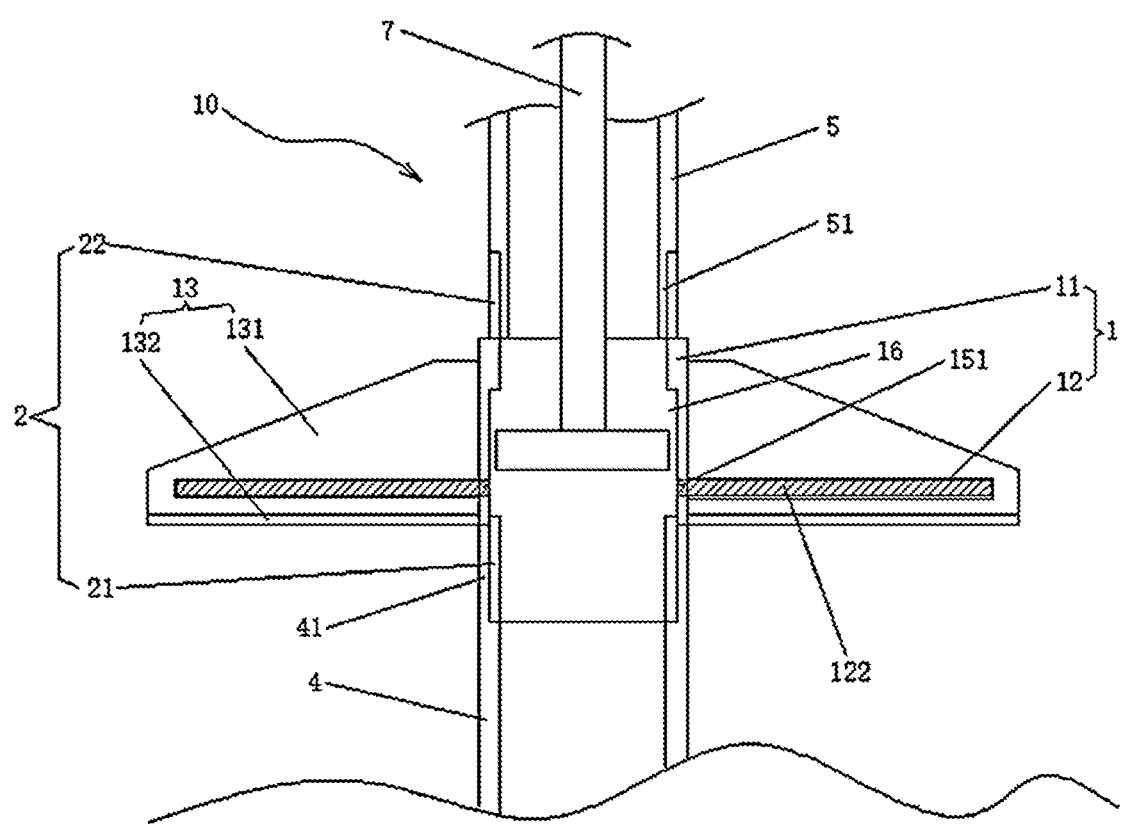
FIG. 6 is a schematic structural view of a bearing capacity reinforcing device for internal spiral conduits of the present disclosure in a working state 2.

As illustrated in FIGS. 5 and 6, a working process of the bearing capacity reinforcing device for internal spiral conduits is as follows:

step S1: seating the bearing capacity reinforcing device on a female buckle 41 of a conduit 4 (i.e., a riser or a surface conduit) placed on a rotary table surface 3 in a sequence that a male buckle end 21 of a connecting portion 2 is lower and a female buckle end 22 thereof is upper, and performing a buckling operation;

step S2: adjusting positions of sector plates 122 of the bearing capacity reinforcing device to ensure that each of the sector plates 122 is in the accommodating space 121 of the reinforcing disc 12, without being freely movable, and covers the plurality of perforated portions 123 on the reinforcing disc 12;

step S3: cleaning the female buckle end 22 of the connecting portion 2 and applying a thread compound thereto, lifting up a new conduit 5 (i.e. a riser or a surface conduit), seating a male buckle 51 of the conduit 5 in the female buckle end 22 of the connecting portion 2 of the bearing capacity reinforcing device, and performing a buckling operation;

step S4: setting a combined structure of the bearing capacity reinforcing device and a conduit string 10 (including the conduit 5 and the conduit 4), and continuing to connect a new conduit and/or a new bearing capacity reinforcing device according to actual needs until a driving depth of the conduit 4 reaches a design depth;

step S5: setting an operating tool 7 from a top end of the conduit into the bearing capacity reinforcing device, and adjusting the positions of the plurality of sector plates 122 to ensure that the sector plates 122 can completely cover the plurality of perforated portions 123 on the reinforcing disc 12.

The bearing capacity reinforcing device of the present disclosure is located at a middle and/or a tail of a conduit, and may be plurally connected between the conduits at intervals at the same time, or may be singularly connected between the conduits, i.e., the bearing capacity reinforcing device may be used repeatedly for multiple times, or used singularly or plurally at the same time, so as to increase the bearing capacity of the conduit to the greatest extent, while the problem of difficulty in setting the device will not occur; during use, the present disclosure can reduce the driving depth of the conduit, and save the operation time and cost, thus achieving the advantages of a simple structure, a low cost, a convenient use, an easy operation and a high reliability.

Embodiment 2

As illustrated in FIGS. 1 to 6, the present disclosure further provides a method for using the bearing capacity reinforcing device for internal spiral conduits as described above, comprising:

step S1: seating the bearing capacity reinforcing device on a female buckle 41 of a conduit 4 (i.e., a riser or a surface conduit) placed on a rotary table surface 3, and performing a buckling operation;

step S2: adjusting positions of a plurality of sector plates 122 of the bearing capacity reinforcing device to ensure that each of the sector plates 122 does not block a plurality of perforated portions 123 on the reinforcing disc 12;

step S3: lifting up another conduit 5, seating a male buckle 51 of the another conduit 5 in a female buckle end 22 of the bearing capacity reinforcing device, and performing a buckling operation;

step S4: setting a combined structure of the bearing capacity reinforcing device and a conduit string 10 (including the conduit 5 and the conduit 4), until a driving depth of the conduit 4 reaches a design depth; and step S5: setting an operating tool 7 into the bearing capacity reinforcing device, and adjusting the positions of the plurality of sector plates 122 so that the plurality of sector plates 122 can block the plurality of perforated portions 123 on the reinforcing disc 12.

In step S1, the bearing capacity reinforcing device is seated on the female buckle 41 of the conduit 4 (i.e., a riser or a surface conduit) placed on the rotary table surface 3 in a sequence that a male buckle end 21 of a connecting portion 2 is lower and a female buckle end 22 thereof is upper, and then the buckling operation is performed.

Before step S3 is performed, the female buckle end 22 of the connecting portion 2 is cleaned and a thread compound is applied thereto.

In step S4, it may continue to connect a new conduit and/or a new bearing capacity reinforcing device to the combined structure of the bearing capacity reinforcing device and the conduit string 10, according to actual needs.

During use, the present disclosure can reduce the driving depth of the conduit, and save the operation time and cost, thus achieving the advantages of a simple structure, a low cost, a convenient use, an easy operation and a high reliability.

Those described above are just several embodiments of the present disclosure. A person skilled in the art can make various changes or modifications to the embodiments of the present disclosure according to the content disclosed by the application document, without deviating from the spirit or scope of the present disclosure.

The invention claimed is:

1. A bearing capacity reinforcing device, comprising:
a reinforcing mechanism having a reinforcing body and a reinforcing disc connected to a lower portion of the reinforcing body, a plurality of reinforcing rib plates being spaced apart in a circumferential direction of the reinforcing body and connected to the reinforcing disc; wherein the reinforcing disc is provided with a plurality of accommodating spaces which are spaced apart in a circumferential direction thereof and provided therein with a movable sector plate, respectively, and the reinforcing disc at each of the accommodating spaces is provided with a perforated portion which can be blocked by the sector plate; and a connecting portion having a male threaded connection end connected to a lower end of the reinforcing body, and a female threaded connection end connected to an upper end of the reinforcing body.

2. The bearing capacity reinforcing device according to claim 1, wherein the perforated portion comprises a plurality of through-holes spaced apart in a radial direction of the reinforcing disc.

3. The bearing capacity reinforcing device according to claim 2, wherein the through-holes have diameters sequentially increased in a radial outward direction of the reinforcing disc.

4. The bearing capacity reinforcing device according to claim 1, wherein the reinforcing rib plate comprises an upper rib plate in welded connection with an upper surface of the reinforcing disc and the female threaded connection end, and a lower rib plate in welded connection with a lower surface of the reinforcing disc and the male threaded connection end.

5. The bearing capacity reinforcing device according to claim 4, wherein the upper rib plate is a flat plate in a right-angled trapezoidal shape.

6. The bearing capacity reinforcing device according to claim 1, wherein an annular groove is formed on an inner sidewall of the reinforcing body, an annular body is rotatably provided in the annular groove, and inner ends of the plurality of sector plates are connected to the annular body.

7. The bearing capacity reinforcing device according to claim 6, wherein an inner annular wall of the annular body is provided with a plurality of keyways spaced apart in a circumferential direction thereof.

8. The bearing capacity reinforcing device according to claim 1, wherein a width of the accommodating space is twice a width of the sector plate.

9. The bearing capacity reinforcing device according to claim 1, wherein an inner wall of the reinforcing body is provided with an annular accommodating groove.

* * * * *